US009957587B2

(12) United States Patent
Xi et al.

(10) Patent No.: US 9,957,587 B2
(45) Date of Patent: May 1, 2018

(54) PROCESS FOR EFFICIENTLY ENRICHING AND RECOVERING NOBLE METALS OF PLATINUM AND PALLADIUM BY SOLVENT EXTRACTION

(71) Applicant: Beijing University of Technology, Beijing (CN)

(72) Inventors: Xiaoli Xi, Beijing (CN); Zuoren Nie, Beijing (CN); Xiaokai Sun, Beijing (CN); Liwen Ma, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 276 days.

(21) Appl. No.: 14/903,513

(22) PCT Filed: Jun. 26, 2014

(86) PCT No.: PCT/CN2014/080778
§ 371 (c)(1),
(2) Date: Jan. 7, 2016

(87) PCT Pub. No.: WO2015/180224
PCT Pub. Date: Dec. 3, 2015

(65) Prior Publication Data
US 2016/0153066 A1 Jun. 2, 2016

(30) Foreign Application Priority Data
May 31, 2014 (CN) .......................... 2014 1 0241155

(51) Int. Cl.
| | | |
|---|---|---|
| *C22B 11/00* | (2006.01) | |
| *C22B 3/00* | (2006.01) | |
| *C22B 3/22* | (2006.01) | |
| *C22B 3/44* | (2006.01) | |
| *C22B 3/26* | (2006.01) | |
| *C22B 3/28* | (2006.01) | |
| *C22B 3/34* | (2006.01) | |

(52) U.S. Cl.
CPC ............ *C22B 11/04* (2013.01); *C22B 3/0009* (2013.01); *C22B 3/0012* (2013.01); *C22B 3/0031* (2013.01); *C22B 3/22* (2013.01); *C22B 3/44* (2013.01); *Y02P 10/234* (2015.11)

(58) Field of Classification Search
CPC ... C22B 3/0009; C22B 3/0012; C22B 3/0031; C22B 11/04
See application file for complete search history.

(56) References Cited

U.S. PATENT DOCUMENTS

2010/0029900 A1* 2/2010 Yoon .................... C08F 6/02
528/487

FOREIGN PATENT DOCUMENTS

| CN | 1035321 A | 9/1989 |
|---|---|---|
| CN | 1609241 A | 4/2005 |
| CN | 1749921 A | 3/2006 |
| CN | 101020964 A | 8/2007 |
| CN | 101045962 A | 10/2007 |
| CN | 101148703 A | 3/2008 |
| CN | 103805784 A | 5/2014 |
| RU | 2226224 C2 | 3/2004 |

OTHER PUBLICATIONS

Lee, Jin-Young et al. "Liquid-liquid extraction/separation of platinum(IV) and rhodium(III) from acidic chloride solutions using tri-iso-octylamine." Journal of Hazardous Materials. vol. 168, pp. 424-429. (Year: 2009).*
Kavlentis, E. "Extractive Spectrophotometric Determination of Palladium(II) and Platinum(II) with 2-Allylthiourea and Thiocyanate in the Presence of EDTA." Microchemical Journal. vol. 36, pp. 306-308. (Year: 1987).*
Bhaskare, C.K. et al. "Separation and Extractive Spectrophotometric Determination of Palladium and Platinum with 6-Aminoquinoxaline-2,3-dithiol." Analyst. vol. 106, pp. 1005-1009. Accessed online http://pubs.rsc.org/en/content/articlepdf/1981/an/an9810601005 (Year: 1981).*
Aneva, Z. et al. "Synergetic Extraction of Platinum(IV) from Dilute Hydrochloric Acid by Isoamyl Alcohol-Methylisobutylketone Mixture." Microchimica Acta. vol. 88, Issue 5-6 pp. 341-350. (Year: 1986).*
International Search Report, dated Feb. 26, 2015 in connection with PCT International Application No. PCT/CN2014/080778, filed Jun. 26, 2014.
First Office Action in connection with Chinese Patent Application No. CN 201410241155.4.

(Continued)

*Primary Examiner* — George Wyszomierski
*Assistant Examiner* — Tima M McGuthry Banks
(74) *Attorney, Agent, or Firm* — John P. White; Cooper and Dunham LLP

(57) ABSTRACT

The present invention relates to a process for efficiently enriching and recovering noble metals of platinum and palladium based on solvent extraction, wherein isoamyl alcohol is used as extracting agent and 2-methoxyphenyl thiourea is used as extraction-assisted complexing agent. 2-methoxy-phenyl thiourea is added to aqueous phase to react with platinum and palladium, and isoamyl alcohol is used as extracting agent to extract the organic phase, thus realizing the purpose of separating and extracting noble metals from base metals while enriching noble metals of platinum and palladium. The present invention, which can not only realize the separation of noble metals and base metals, but also enhance the enrichment and recovery ratios of noble metals of platinum and palladium, with low cost reagents, small influence on the environment and simple technical process, thus is a new and efficient extraction and enrichment system for noble metals.

3 Claims, No Drawings

(56) References Cited

OTHER PUBLICATIONS

Second Office Action in connection with Chinese Patent Application No. CN 201410241155.4.
Search Report in connection with Chinese Patent Application No. CN 201410241155.4.

* cited by examiner

US 9,957,587 B2

PROCESS FOR EFFICIENTLY ENRICHING AND RECOVERING NOBLE METALS OF PLATINUM AND PALLADIUM BY SOLVENT EXTRACTION

CROSS-REFERENCE TO RELATED APPLICATIONS

This application is a § 371 national stage of PCT International Application No. PCT/CN2014/080778, filed Jun. 26, 2014, claiming priority of Chinese Patent Application No. 201410241155.4, filed May 31, 2014, the contents of each of which are hereby incorporated by reference in their entirety.

TECHNICAL FIELD

The present invention relates to a system of solvent extraction for enriching and recovering noble metals of platinum and palladium, which utilizes solvent extraction to separate and extract noble metals of platinum and palladium from other base metals, so as to achieve the purpose of enriching and recovering noble metals of platinum and palladium. The present invention belongs to the technical field of resource recovery.

BACKGROUND TECHNOLOGY

With the development of economy and society, there is ever-rising demand for noble metals. Noble metals, especially platinum group metals, are more and more widely applied in various fields such as petrochemical industry, exhaust gas purification, electronics and the like. There are rare reserves of platinum group metals in the crust, but in some noble metals-containing waste resources, such as discarded electronic components, etc., there contain a substantial content of noble metals of platinum and palladium. Recovery of noble metals of platinum and palladium from secondary resources may make up part of the shortage of supply. With the development of various fields, the secondary resources producing noble metals of platinum and palladium are also increasing. Therefore, recycling of waste containing noble metals of platinum and palladium into resources has become a major subject along with the development of our society and economy.

There are many methods for enriching and recovering noble metals, the traditional separation and extraction process for platinum group is mainly based on precipitation, which has the disadvantages such as tedious process, low yield, high cost and complicated operation. Since the process of solvent extraction and separation process showed its superiority, application of the process for extracting and purifying platinum group metals has attracted great attention. Solvent extraction technology, which has the advantages such as simple process, good separation effect, high yield of noble metals, safe production operations, high suitability and flexibility for various materials, large processing capacity, easy implementation of automation and the like, has been regarded by domestic and international scholars as a high and new technology for separating and extracting platinum group metals.

However, in the process of solvent extraction, due to the complexity of the components contained in the waste of resources, separation and enrichment of noble metals from base metal have always been a relatively tedious process. The presence of base metals often affects extraction and recovery of noble metals, resulting in shortcomings including complex process of recovery, increased energy consumption, environmental pollution, as well as low cost efficiency and the like.

SUMMARY OF THE INVENTION

The object of the present invention is to provide a simple, easily operated process system of solvent extraction, which can efficiently enrich and extract noble metals of platinum and palladium, so as to overcome the defects of existing technologies.

The present invention uses isoamyl alcohol as extracting agent and 2-methoxy-phenyl thiourea as extraction-assisted complexing agent, and realizes the enrichment and recovery for noble metals of platinum and palladium by appropriate process, which is efficient and convenient to join the extraction, separation and purification process of the noble metals together.

To achieve the above object, the steps of the present invention are provided as follows:

Provided is a process for efficiently enriching and recovering noble metals of platinum and palladium based on solvent extraction, characterized in that: using isoamyl alcohol as extracting agent and 2-methoxyphenyl thiourea as extraction-assisted complexing agent to perform enrichment and extraction of a feed liquid containing noble metals of platinum and palladium, the operation steps are as follows:

(1) adding 2-methoxyphenyl thiourea-hydrochloric acid solution to a feed liquid containing noble metals of platinum and palladium, adjusting the acidity of the feed liquid, i.e. $H^+$ concentration, to 3-5 mol/L, shaking well and standing as an original solution of aqueous phase; the original solution of aqueous phase containing platinum and palladium with a concentration of 0.01-5 mg/L;

(2) measuring a certain amount of isoamyl alcohol as an organic phase;

(3) adding the organic phase and the original solution of aqueous phase to a separatory funnel in a volume ratio of 1:1 to 1:2.5, shaking the mixture for 1-5 minutes, then standing for liquid separation, to obtain raffinate and an organic phase after the liquid separation, subjecting the organic phase after the liquid separation to stripping back extraction, and performing liquid separation again to obtain a stripping solution, thereby completing the enrichment and extraction of the noble metals.

Further, the extraction-assisted complexity agent of 2-methoxyphenyl thiourea-hydrochloric acid solution has a HCl concentration of 2.5-6 mol/L, wherein the mass percent of 2-methoxyphenyl thiourea is 0.01% to 0.5%.

Further, the volume ratio of the added 2-methoxyphenyl thiourea-hydrochloric acid solution to the resulting original solution of aqueous phase is 1:2 to 1:5.

The organic phase after the liquid separation is subjected to stripping back extraction, after the completion of the stripping back extraction, a stripping solution and an organic phase after the stripping back extraction are obtained through liquid separation, and the organic phase after the stripping back extraction continues to be used for extraction;

The raffinate and the stripping solution are subjected to dilution and the extraction result is tested by ICP.

The extraction system according to the present invention has a simple process and a high efficiency of separation and enrichment, and is convenient to join the separation and purification process of the noble metals together.

The extracting agent is isoamyl alcohol, and the extraction-assisted complexing agent is 2-methoxyphenyl thiourea.

Said 2-methoxy-phenyl thiourea-hydrochloric acid solution has a HCl concentration of 2.5-6 mol/L, wherein the mass percent of 2-methoxy-phenyl thiourea is 0.01% to 0.5%, and the solution is prepared in the water bath of 25-50° C. with stirring to facilitate dissolution.

The volume ratio of the added 2-methoxyphenyl thiourea-hydrochloric acid solution to the resulting original solution of aqueous phase is 1:2 to 1:5, and the resulting original solution of aqueous phase contains platinum, palladium with a concentration of 0.01-5 mg/L.

The stripping back extraction uses an aqueous solution of thiourea, wherein the mass percent of thiourea is ranging from 1% to 5%.

The advantages of the present invention are listed as follows:

(1) by using iso-amyl alcohol as extracting agent without the addition of other diluents, it can simplify the process, be economical and environment friendly;

(2) by adding 2-methoxy-phenyl thiourea as extraction-assisted complexity agent to the aqueous phase to make the noble metals and base metals be separated during extraction, the effect of extracting noble metals of platinum and palladium in high efficiency without extracting base metals can be achieved;

(3) the system of the present invention has simple operation process, low requirement for equipment good effect of enrichment and extraction of noble metals of platinum and palladium, and greater adaptability and flexibility.

BEST MODE FOR CARRYING THE EMBODIMENTS

The present invention will be further described with reference to the following specific examples.

Example 1

1. Working fluid with a concentration of 25 mg/L of each of platinum and palladium was prepared, respectively, and working fluid with a concentration of 400 mg/L of each of nickel, copper, iron, aluminium and manganese was prepared, respectively.

2-methoxyphenyl thiourea was dissolved with a HCl solution of 2.5 mol/L in a water bath at constant temperature of 35° C. with magnetic stirring, and the mass percent of 2-methoxyphenyl thiourea was 0.05%, so as to obtain a 2-methoxy phenyl thiourea-hydrochloric acid solution of 0.05%.

2. Preparation of original solution of aqueous phase:

In the experiment, 25 ml of aqueous phase was used in each group of extraction experiment, and one group of experiment as an example was shown below:

1 ml of previously prepared working fluid of each of platinum, palladium, nickel, copper, iron, aluminum, manganese and 10 ml of 0.05% of 2-methoxyphenyl thiourea-hydrochloric acid solution were taken by pipettes, then the acidity ([H$^+$]) was adjusted to 3 mol/L, to obtain 25 ml of original solution of aqueous phase, followed by shaking before use. The contents of each noble or base metal in the original solution of aqueous phase are shown in Table 1:

TABLE 1

| metal | platinum | palladium | nickel | copper | iron | aluminum | manganese |
|---|---|---|---|---|---|---|---|
| concentration mg/L | 1 | 1 | 16 | 16 | 16 | 16 | 16 |

3. Solvent extraction:

25 ml of prepared original solution of aqueous phase and 15 ml of isoamylalcohol organic phase were poured into a separating funnel of 50 ml at room temperature, then the funnel was placed on speed adjustable shaker to perform extraction reaction for 4 minutes. After the completion of the extraction, it was left standing for liquid separation to obtain raffinate, and the organic phase remained in the separating funnel.

4. Stripping back extraction:

A thiourea aqueous solution with 2% of mass percent concentration was prepared, 20 ml of the solution was taken by using pipette and poured into the separating funnel after the liquid separation of step 3, to perform stripping back extraction experiment with the organic phase therein with shaking time of 5 minutes. After the completion of the stripping back extraction, liquid separation was performed to obtain stripping solution and an organic phase after the stripping back extraction. The organic phase after the stripping back extraction may continue to be used for extraction in step 3 for repeated use.

5. Analysis of experiment results:

After the completion of extraction and stripping back extraction experiments, the raffinate and the stripping solution were subjected to ICP test. It can be obtained through data analysis, the present system had a remarkable effect of enrichment and extraction of noble metals, the extraction rates of platinum and palladium were above 99% and 99.2%, respectively, the stripping rate was close to 100%. The system had no extraction effect on base metals with extraction rate of 0.

Example 2

1. Working fluid with a concentration of 50 mg/L of each of platinum and palladium was prepared, respectively, and working fluid with a concentration of 1000 mg/L of each of nickel, copper, iron, aluminum and manganese was prepared, respectively.

2-methoxyphenyl thiourea was dissolved with a HCl solution of 6 mol/L in a water bath at constant temperature of 40° C. with magnetic stirring, and the mass percent of 2-methoxyphenyl thiourea was 0.2%, so as to obtain a 2-methoxy phenyl thiourea-hydrochloric acid solution of 0.2%.

2. Preparation of original solution of aqueous phase:

In the experiment, 25 ml of aqueous phase was used in each group of extraction experiment, and one group of experiment as an example was shown below:

1 ml of previously prepared working fluid of each of platinum, palladium, nickel, copper, iron, aluminum, manganese and 10 ml of 0.2% of 2-methoxyphenyl thiourea-hydrochloric acid solution were taken by pipettes, then the acidity ([H$^+$]) was adjusted to 4 mol/L, to obtain 25 ml of original solution of aqueous phase, followed by shaking before use. The contents of each noble or base metal in the original solution of aqueous phase are shown in Table 2:

TABLE 2

| metal | platinum | palladium | nickel | copper | iron | aluminum | manganese |
|---|---|---|---|---|---|---|---|
| concentration mg/L | 2 | 2 | 40 | 40 | 40 | 40 | 40 |

TABLE 3

| metal | platinum | palladium | nickel | copper | iron | aluminum | manganese |
|---|---|---|---|---|---|---|---|
| concentration mg/L | 2 | 2 | 40 | 40 | 40 | 40 | 40 |

3. Solvent extraction:

25 ml of prepared original solution of aqueous phase and 20 ml of isoamylalcohol organic phase were poured into a separating funnel of 50 ml at room temperature, then the funnel was placed on speed adjustable shaker to perform extraction reaction for 3 minutes. After the completion of the extraction, it was left standing for liquid separation to obtain raffinate, and the organic phase remained in the separating funnel.

4. Stripping back extraction:

A thiourea aqueous solution with 2% of mass percent concentration was prepared, 20 ml of the solution was taken by using pipette and poured into the separating funnel after the liquid separation of step 3, to perform stripping back extraction experiment with the organic phase therein with shaking time of 5 minutes. After the completion of the stripping back extraction, liquid separation was performed to obtain stripping solution and an organic phase after the stripping back extraction. The organic phase after the stripping back extraction may continue to be used for extraction in step 3 for repeated use.

5. Analysis of experiment results:

After the completion of extraction and stripping back extraction experiments, the raffinate and the stripping solution were subjected to ICP test. It can be obtained through data analysis, the present system had a remarkable effect of enrichment and extraction of noble metals, the extraction rates of platinum and palladium were above 99.5%, respectively, the stripping rate was close to 100%. The system had no extraction effect on base metals with extraction rate of 0.

Example 3

1. Working fluid with a concentration of 50 mg/L of each of platinum and palladium was prepared, respectively, and working fluid with a concentration of 1000 mg/L of each of nickel, copper, iron, aluminum and manganese was prepared, respectively.

2-methoxyphenyl thiourea was dissolved with a HCl solution of 6 mol/L in a water bath at constant temperature of 50° C. with magnetic stirring, and the mass percent of 2-methoxyphenyl thiourea was 0.5%, so as to obtain a 2-methoxy phenyl thiourea-hydrochloric acid solution of 0.5%.

2. Preparation of original solution of aqueous phase:

In the experiment, 25 ml of aqueous phase was used in each group of extraction experiment, and one group of experiment as an example was shown below:

1 ml of previously prepared working fluid of each of platinum, palladium, nickel, copper, iron, aluminum, manganese and 10 ml of 0.5% of 2-methoxyphenyl thiourea-hydrochloric acid solution were taken by pipettes, then the acidity ($[H^+]$) was adjusted to 4 mol/L, to obtain 25 ml of original solution of aqueous phase, followed by shaking before use. The contents of each noble or base metal in the original solution of aqueous phase are shown in Table 3:

3. Solvent extraction:

25 ml of prepared original solution of aqueous phase and 25 ml of isoamylalcohol organic phase were poured into a separating funnel of 50 ml at room temperature, then the funnel was placed on speed adjustable shaker to perform extraction reaction for 2 minutes. After the completion of the extraction, it was left standing for liquid separation to obtain raffinate, and the organic phase remained in the separating funnel.

4. Stripping back extraction:

A thiourea aqueous solution with 3% of mass percent concentration was prepared, 20 ml of the solution was taken by using pipette and poured into the separating funnel after the liquid separation of step 3, to perform stripping back extraction experiment with the organic phase therein with shaking time of 5 minutes. After the completion of the stripping back extraction, liquid separation was performed to obtain stripping solution and an organic phase after the stripping back extraction. The organic phase after the stripping back extraction may continue to be used for extraction in step 3 for repeated use.

5. Analysis of experiment results:

After the completion of extraction and stripping back extraction experiments, the raffinate and the stripping solution were subjected to ICP test. It can be obtained through data analysis, the present system had a remarkable effect of enrichment and extraction of noble metals, the extraction rates of platinum and palladium were above 99.9%, respectively, the stripping rate was close to 100%. The system had no extraction effect on base metals with extraction rate of 0.

What is claimed is:

1. A process for efficiently enriching and recovering noble metals of platinum and palladium based on solvent extraction, characterized in that: using isoamyl alcohol as extracting agent and 2-methoxyphenyl thiourea as extraction-assisted complexing agent to perform enrichment and extraction of a feed liquid containing noble metals of platinum and palladium, wherein the process comprises the following operation steps of:

(1) adding 2-methoxyphenyl thiourea-hydrochloric acid solution to the feed liquid containing noble metals of platinum and palladium, adjusting the acidity of the feed liquid, so that $H^+$ concentration is in the range of 3-5 mol/L to form an original solution of aqueous phase, shaking the original solution and standing the original solution of aqueous phase; the original solution of aqueous phase containing platinum and palladium with a concentration of 0.01-5 mg/L;

(2) taking isoamyl alcohol as an organic phase;

(3) adding the organic phase and the original solution of aqueous phase in a volume ratio of 1:1 to 1:2.5 to a separatory funnel, shaking for 1-5 minutes, then standing for liquid separation, to obtain raffinate and organic phase after the liquid separation, subjecting the organic phase after the liquid separation to stripping back extraction, and performing liquid separation again to obtain a stripping solution, thereby completing the enrichment and extraction of the noble metals.

2. The process for efficiently enriching and recovering noble metals of platinum and palladium based on solvent extraction according to claim 1, wherein the extraction-assisted complexing agent of 2-methoxyphenyl thiourea-hydrochloric acid solution has a HCl concentration of 2.5-6 mol/L, wherein 2-methoxyphenyl thiourea has a mass percent of 0.01% to 0.5%.

3. The process for efficiently enriching and recovering noble metals of platinum and palladium based on solvent extraction according to claim 1, wherein the volume ratio of the added 2-methoxyphenyl thiourea-hydrochloric acid solution and the resulting original solution of aqueous phase is 1:2 to 1:5.

\* \* \* \* \*